United States Patent
Kaliyamoorthy (10) Patent No.: US 11,509,568 B2
(45) Date of Patent: Nov. 22, 2022

(54) PROTOCOL INDEPENDENT MULTICAST DESIGNATED NETWORKING DEVICE ELECTION SYSTEM

(71) Applicant: Dell Products L.P., Round Rock, TX (US)

(72) Inventor: Karthi Kaliyamoorthy, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 413 days.

(21) Appl. No.: 16/585,321

(22) Filed: Sep. 27, 2019

(65) Prior Publication Data

US 2021/0099379 A1 Apr. 1, 2021

(51) Int. Cl.
*H04L 45/00* (2022.01)
*H04L 45/18* (2022.01)
*H04L 45/16* (2022.01)

(52) U.S. Cl.
CPC .............. *H04L 45/14* (2013.01); *H04L 45/16* (2013.01); *H04L 45/18* (2013.01)

(58) Field of Classification Search
CPC ......... H04L 45/02; H04L 45/14; H04L 45/16; H04L 45/18
See application file for complete search history.

(56) References Cited

U.S. PATENT DOCUMENTS

| 7,760,668 | B1 * | 7/2010 | Zinjuvadia | H04L 45/02 370/256 |
| 9,270,426 | B1 * | 2/2016 | Atlas | H04L 5/0053 |
| 2020/0412639 | A1 * | 12/2020 | Meo | H04L 45/125 |

* cited by examiner

*Primary Examiner* — Saad A. Waqas
(74) *Attorney, Agent, or Firm* — Joseph Mencher (57) ABSTRACT

A Protocol Independent Multicast (PIM) designated networking device election system includes a first networking device and a second networking device that are coupled to the first edge device. The second networking device receives a first PIM message from the first networking device and determines that the first PIM message indicates that the first networking device supports designated networking device election based on an interface performance property. The second networking device then determines whether a first interface performance property indication indicates that a first interface performance property of the first networking device or a second interface performance property of the second networking device satisfy an interface performance property condition. In response to determining that the second interface performance property satisfies the interface performance property condition, the second networking device forwards first data traffic received at the second networking device toward the first edge device.

20 Claims, 7 Drawing Sheets

PROTOCOL INDEPENDENT MULTICAST DESIGNATED NETWORKING DEVICE ELECTION SYSTEM

The present disclosure relates generally to information handling systems, and more particularly to electing a designated information handling system that is Protocol Independent Multicast (PIM) enabled to forward data traffic.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes used to provide multicast networks that may utilize a multicast protocol such as Protocol Independent Multicast (PIM). PIM is not dependent on a specific unicast routing protocol; it is IP routing protocol independent and can leverage whichever unicast routing protocols are used to populate a unicast routing table, including the Enhanced Interior Gateway Routing Protocol (EIGRP), the Open Shortest Path First (OSPF), the Border Gateway Protocol (BGP), and static routes. PIM uses unicast routing information to perform the multicast forwarding function, and some modes of PIM (e.g., PIM sparse mode (PIM-SM), bidirectional PIM (Bidir-PIM), etc.) require that networking devices within the multicast network be designated for each edge device in the network, which may include, for example, Provider Edge (PE) devices and/or Customer Edge (CE) devices in multi-homed networks. For example, if multiple networking devices are coupled to the edge devices, multicast traffic may be sent from or received by the edge device via the multiple networking devices, and because only one copy of the multicast data traffic is needed by the edge device, any additional copies of the data traffic unnecessarily uses network resources. As such, one of the multiple networking devices coupled to the edge device is elected as a designated networking and provides for the forwarding of the data traffic, while the other networking device(s) blocks traffic between the edge device and the rest of the multicast network.

For example, the designated networking device may be elected via an exchange of discovery messages (e.g., PIM hello messages) between the networking devices in the multicast network, and those discovery messages may include a priority for each networking device, with the highest priority networking device coupled to the edge device elected as the designated router. Furthermore, if there is no priority associated with the networking devices coupled to the edge device, or if the networking devices coupled to the edge device have the same priority, the networking device with the highest Internet Protocol (IP) address may be elected as the designated networking device. However, such solutions do not consider interface performance properties (e.g., bandwidth, speed, etc.) of the multiple networking devices coupled to the edge device. As such, the designated networking device may have, for example, a lower bandwidth than a non-designated networking device, which may result in a relatively high bandwidth utilization on the link between the designated networking device and the edge device. Such relatively high bandwidth utilization on the link between the designated networking device and the edge device can result in the dropping of data traffic, particularly when that link has relatively high bandwidth utilization for other data traffic.

Accordingly, it would be desirable to provide an improved PIM designated networking device election system.

SUMMARY

According to one embodiment, an Information Handling System (IHS) includes a communication subsystem; a processing system that is coupled to the communication subsystem; and a memory system that is coupled to the processing system and that includes instructions that, when executed by the processing system, cause the processing system to provide a forwarding engine that is configured to: receive, via the communication subsystem from a first networking device, a first Protocol Independent Multicast (PIM) message; determine that the first PIM message indicates that the first networking device supports designated networking device election based on an interface performance property; determine whether a first interface performance property indication included in the first PIM message indicates that a first interface performance property of the first networking device or a second interface performance property of the second networking device satisfy an interface performance property condition; and forward, in response to determining that the second interface performance property of the second networking device satisfies the interface performance property condition and the first interface performance property of the first networking device does not satisfy the interface performance property condition, first data traffic received at the second networking device toward a first edge device coupled to the first networking device and the communication subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
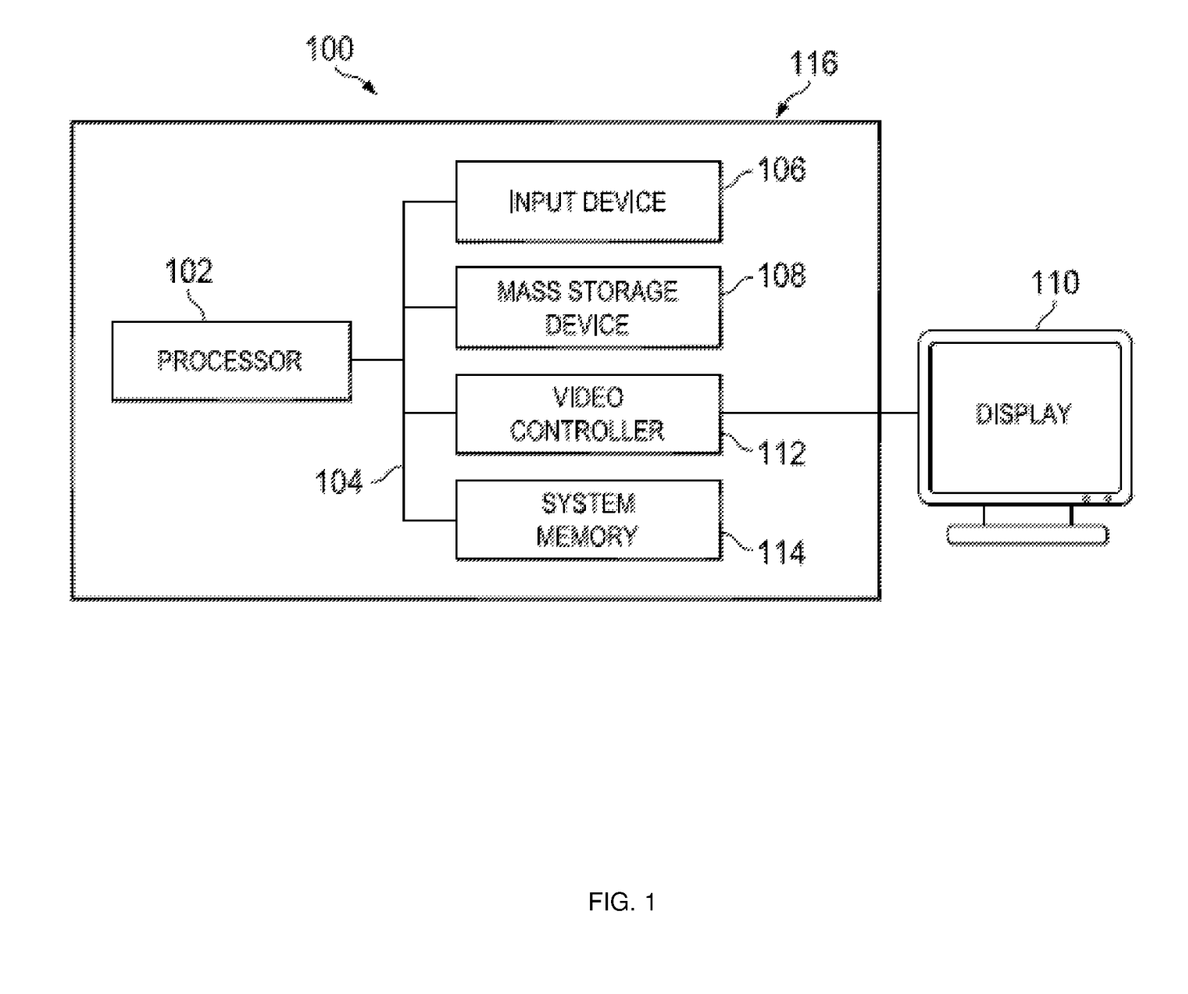
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
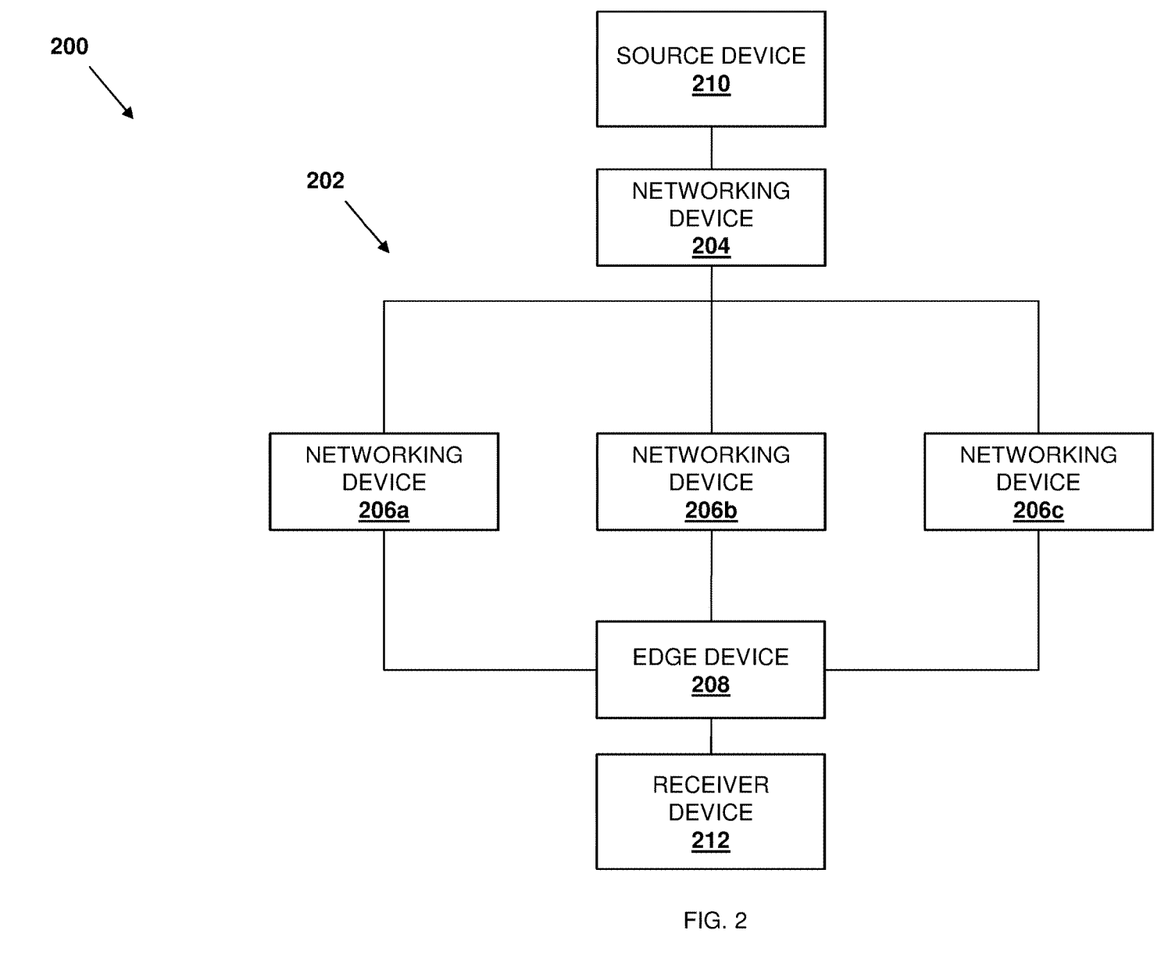
FIG. 2 is a schematic view illustrating an embodiment of a Protocol Independent Multicast (PIM) designated networking device election system.

Referring now to FIG. 2, an embodiment of a Protocol Independent Multicast (PIM) designated networking device election system 200 is illustrated. In the illustrated embodiment, the PIM designated networking device election system 200 includes a multicast group 202 that utilizes a multicast protocol such as PIM (e.g., PIM sparse mode (PIM-SM), Bidirectional PIM (Bidir PIM, PIM dense mode (PIM-DM), etc.) and/or any other multicast protocol that would be apparent to one of skill in the art in possession of the present disclosure. The multicast group includes a networking device 204 that may be provided by the IHS 100 discussed above with reference to FIG. 1 and/or may include some or all of the components of the IHS 100. In a specific example, the networking device 204 may be provided by a switch device, a routing device, and/or any other networking device capable of performing the functionality of the networking devices discussed below. In the examples discussed below, the networking device 204 provides a rendezvous point. As would be appreciated by one of skill in the art in possession of the present disclosure, the rendezvous point may be a point in the multicast group 202 where source devices included in the multicast group 202 can direct multicast traffic, or where sources devices may send messages to join the multicast group 202, as well as where receiver devices included in the multicast group 202 can pull multicast traffic sent by the sources device, or where receiver devices seeking to join the multicast group 202 can send messages to join the multicast group 202. However, while a single networking device 204 configured as a rendezvous point is provided in the examples below, one of skill in the art in possession of the present disclosure will recognize that the PIM designated networking device election system 200 may include a plurality of networking devices that are configured as rendezvous points in the multicast group 202, and/or additional multicast groups that uses the PIM protocol within a network topology, while remaining within the scope of the present disclosure as well.

In the illustrated embodiment, the PIM designated networking device election system 200 also includes a plurality of networking devices such as, for example, the networking devices 206a, 206b, and 206c, any or all of which may be provided by the IHS 100 discussed above with reference to FIG. 1 and/or may include some or all of the components of the IHS 100. In specific examples, each of the networking devices 206a-c may be provided by a router device, a switch device, and/or any other networking device capable of performing the functionality of the networking devices 206a-206c discussed below, including the forwarding of traffic between the networking device 204 and receiver devices and/or sources devices. While three networking devices 206a-206c are illustrated in the multicast group, one of skill in the art in possession of the present disclosure will recognize that any multicast group with two or more networking devices coupled to the networking device 204 may be benefit from the teachings of the present disclosure.

In the illustrated embodiment, the PIM designated networking device election system 200 also includes an edge device 208 that is coupled to via respective connections to each of the networking devices 206a, 206b, and 206c. In an embodiment, the edge device 208 may be provided by the IHS 100 discussed above with reference to FIG. 1 and/or may include some or all of the components of the IHS 100. In a specific example, the edge device 208 may be provided by a Customer Edge (CE) device such as, for example, a switch device, a router device, and/or any other multi-homed/multi-access edge device that receives data traffic from the networking devices 206a, 206b, and/or 206c and/or provides data traffic to the networking devices 206a, 206b, and/or 206c in the manner discussed below while remaining within the scope of the present disclosure as well.

In the illustrated embodiment, a source device 210 is coupled via a connection to the networking device 204. In an embodiment, the source device 210 may be provided by the IHS 100 discussed above with reference to FIG. 1 and/or may include some or all of the components of the IHS 100. In a specific example, the source device 210 may be provided by a server device, a networking device such as, for example, a router device and/or switch device, and/or any other computing device that receives data traffic from the networking device 204 and/or provides data traffic to the networking device 204 in the manner discussed below while remaining within the scope of the present disclosure as well.

In the illustrated embodiment, a receiver device 212 is coupled via a connection to the edge device 208. In an embodiment, the receiver device 212 may be provided by the IHS 100 discussed above with reference to FIG. 1 and/or may include some or all of the components of the IHS 100. In a specific example, the receiver device 212 may be provided by a client device, a networking device such as, for example, a router device and/or a switch device, and/or any other computing device that receives data traffic from the edge device 208 and/or provides data traffic to the edge device 208 in the manner discussed below while remaining within the scope of the present disclosure as well. While a specific PIM designated networking device election system 200 is illustrated and described herein, one of skill in the art in possession of the present disclosure will recognize that the networked devices included in the multicast group, as well as the devices coupled to them, may be provided by a variety of devices and/or in a variety of device configurations while remaining within the scope of the present disclosure as well.

Figure 3:
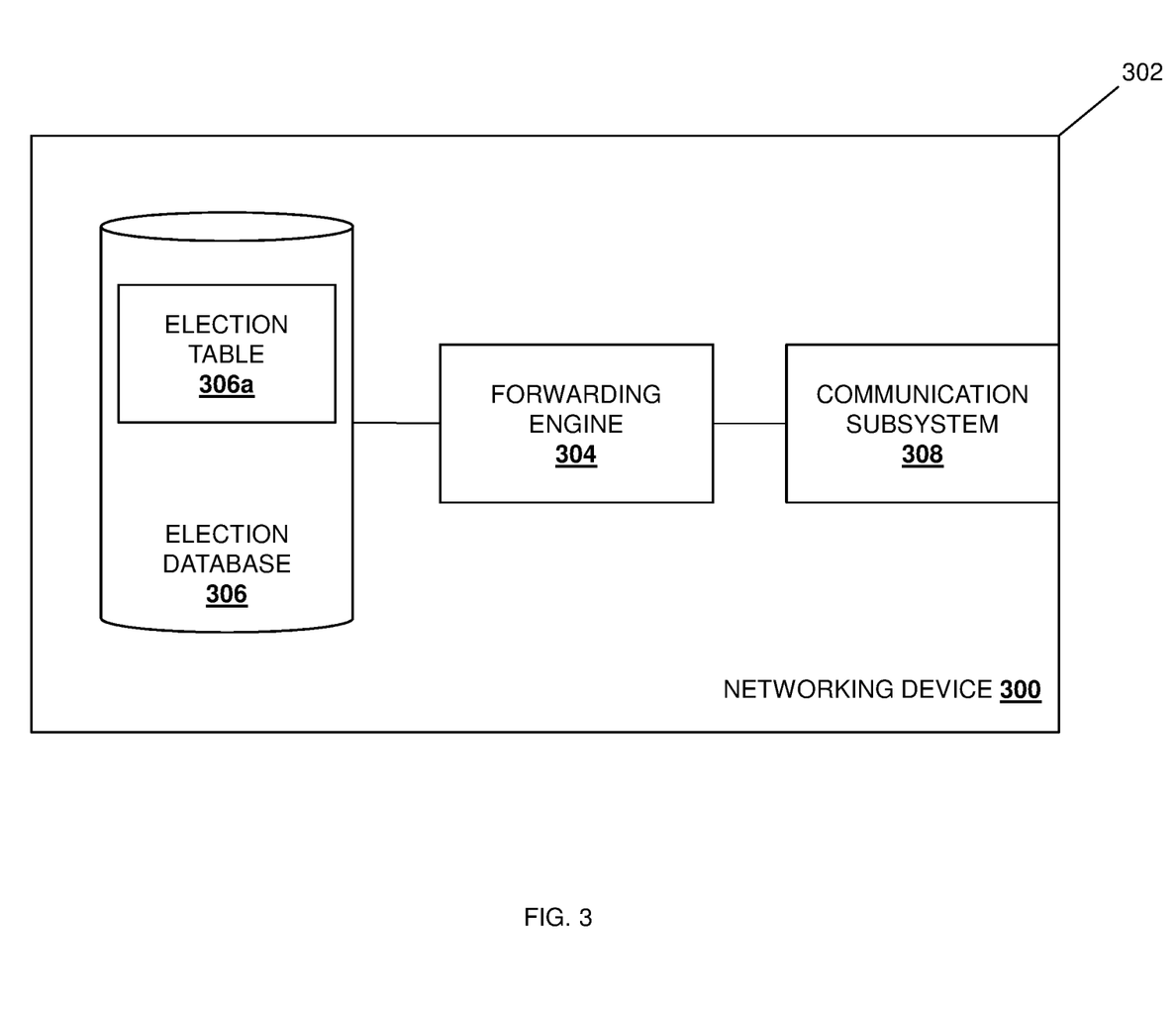
FIG. 3 is a schematic view illustrating an embodiment of a networking device that may be provided in the PIM designated networking device election system of FIG. 2.

Referring now to FIG. 3, an embodiment of a networking device 300 is illustrated that may provide any of the networking device 204 and 206a-206c discussed above with reference to FIG. 2. As such, the networking device 300 may be provided by the IHS 100 discussed above with reference to FIG. 1 and/or may include some or all of the components of the IHS 100, and in specific examples may be provided by a switch device. In the illustrated embodiment, the networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) and a memory system (not illustrated, but which may be provided by the memory system 114 discussed above with reference to FIG. 1) that is coupled to the processing system and that includes instructions that, when executed by the processing system, cause the processing system to provide a forwarding engine 304 that is configured to perform the functionality of the forwarding engines and networking devices discussed below.

The chassis 302 may also house a storage system (not illustrated, but which may include the storage 108 discussed above with reference to FIG. 1) that is coupled the forwarding engine 304 (e.g., via a coupling between the storage system and the processing system) and that includes an election database 306 that is configured to store any of the information utilized by the forwarding engine 304 as discussed below. For example, the election database 306 may store an election table 306a that includes priorities, interface identifiers, performance property information, and/or any other networking device information about the other networking devices included in the PIM designated networking device election system 200 that would be apparent to one of skill in the art in possession of the present disclosure. The chassis 302 also houses a communication subsystem 308 that is coupled to the forwarding engine 304 (e.g., via a coupling between the communication subsystem 308 and the processing system) and that may include a Network Interface Controller (NIC), wireless communication subsystems (e.g., a BLUETOOTH® communication subsystem, a Near Field Communication (NFC) communication subsystem, a WiFi communication subsystem, etc.), and/or any other communication components that would be apparent to one of skill in the art in possession of the present disclosure. While a specific networking device 300 is illustrated and described in FIG. 3, one of skill in the art in possession of the present disclosure will recognize that networking devices may include a variety of components and/or component configurations for performing conventional networking device functionality, as well as the functionality discussed below, while remaining within the scope of the present disclosure as well.

Figure 4:
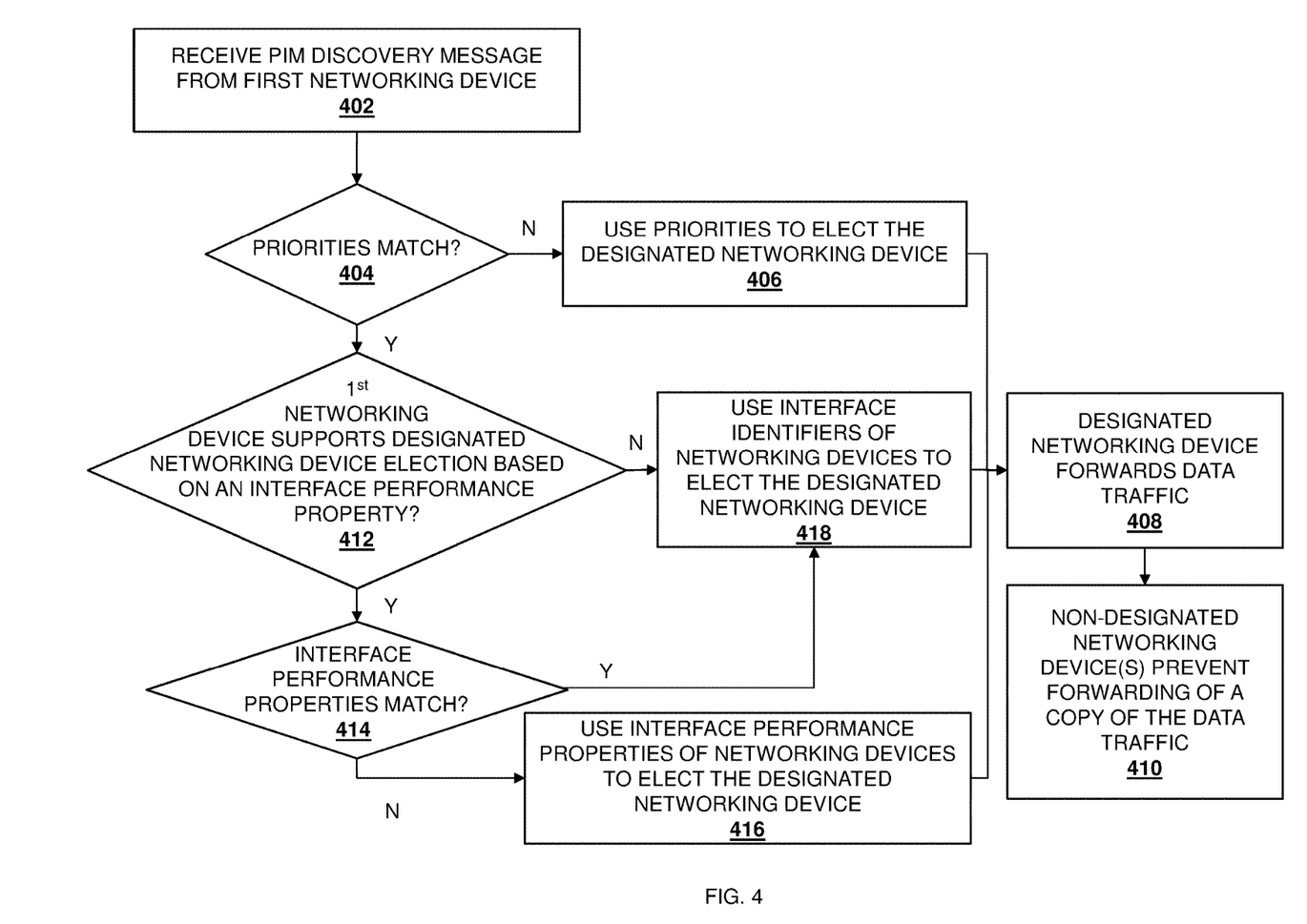
FIG. 4 is a flow chart illustrating an embodiment of a method for electing a networking device as a designated networking device for forwarding data traffic in the PIM designated networking device election system of FIG. 2.

Referring now to FIG. 4, an embodiment of a method 400 for electing a designated networking device in PIM designated networking device election system and forwarding data traffic is illustrated. As discussed below, the systems and methods of the present disclosure provide for the forwarding of one of a plurality of multicast copies of any particular data packet to an edge device using a designated networking device such as a router device. As discussed below, a plurality of networking devices that are each coupled to an edge device may elect a designated networking device by providing, in discovery messages exchanged between the networking devices and provided via the PIM protocol, an indication whether each networking device is enabled to elect a designated networking device based on an interface performance property. If all of the networking devices are enabled to elect a designated networking device based on an interface performance property, then a networking device that determines that it alone satisfies an interface performance property condition based on interface performance properties of each of the plurality of networking devices that exchanged the discovery messages may designate itself as the designated networking device and may subsequently forward data traffic to the edge device or from the edge device, while the other networking devices remain as non-designated networking devices and prevent traffic from being forwarded. As such, networking devices that provide interfaces that have relatively higher performance capabilities are used to forward data traffic, reducing inefficiencies as associated with conventional PIM designation of networking devices that can result in the dropping of data traffic.

The method 400 begins at block 402 where a discovery message is received from networking device(s). In an embodiment, at block 402, the forwarding engine 304 for each of the networking devices 206a, 206b, and/or 206c may transmit discovery messages to each other that include at least an interface performance property and an indication of whether that networking device is enabled to support designated networking device election based on an interface performance property. For example, if the networking devices 206a-206c are PIM enabled, the networking devices 206a-206c may each multicast a PIM hello message to each other. However, while PIM hello messages in PIM enabled networking devices are discussed below, one of skill in the art in possession of the present disclosure will recognize that other discovery messages in other multicast protocols may be utilized with the teachings of the present disclosure and will fall within its scope as well.

In various embodiments, the PIM hello messages may be multicast every 30 seconds by default, although other multicast timings are contemplated as falling within the scope of the present disclosure as well. As will be appreciated by one of skill in the art in possession of the present disclosure, each PIM hello message from a conventional networking device may include a priority and an Internet Protocol address for the networking device. However, the forwarding engines 304 for the networking devices 206a-206c may also be configured to add an indication that that networking device 206a, 206b, and/or 206c supports the interface-performance-property-based designated networking device election of the present disclosure to the PIM hello message, as well as add interface performance property value(s) to the PIM hello message. For example, the PIM hello message may include a plurality of Option Types that each include an Option Length and an Option Value, and an indication that a networking device supports designated networking device election based on an interface performance property may be provided in a consistent Option Type such as Option Type 65001. Similarly, the interface performance property value may be provided in a consistent Option Type such as Option Type 65002. However, one of skill in the art in possession of the present disclosure will recognize that other Option Types or fields may be used in the PIM hello message to advertise the interface performance property and the indication of the ability to perform designated networking device election based on an interface performance property while remaining within the scope of the present disclosure as well. In specific examples, interface performance properties may include a bandwidth of a PIM interface included on the networking device, a speed of the PIM interface included on the networking device, a latency of the PIM interface included on the networking devices, and/or any other networking device and/or interface related performance property that would be apparent to one of skill in the art in possession of the present disclosure.

As such, each of the networking devices 206a, 206b, and/or 206c may receive the PIM hello messages from each other and store the priority, the IP address or other interface identifier, the indication that the networking device supports designated networking device election based on an interface performance property, the interface performance property and/or an interface performance property value thereof, and/or any other PIIM hello message information in the PIM hello message, in an election table 306a in the election database 306. However, while specific examples, of PIM hello message information have been described, one of skill in the art in possession of the present disclosure will recognize that other information may be included in the PIM hello message and stored in the election table 306a without departing from the scope of the present disclosure.

The method 400 then proceeds to decision block 404 where the networking device(s) determine whether the priorities of the networking devices that exchanged the discovery message match. In an embodiment, at decision block 404, the forwarding engine 304 of each of the networking devices 206a-206c may determine whether the priorities assigned to the other networking devices 206a-206c within the multicast group 202 match with its own, and/or satisfy a priority condition (e.g., a predefined priority condition). For example, the networking device 206a may determine whether the priority assigned to the networking device 206a and the priorities of the other networking devices 206b and 206c that were provided in the election table 306a match or are substantially equivalent to each other. As will be appreciated by one of skill in the art in possession of the present disclosure, networking device priorities may match when there are at least two networking devices that each have a priority (e.g., the same priority, substantially equivalent priorities, etc.) that satisfies the priority condition. For example, the networking device 206a and the networking device 206b may each have a priority value of "2" while the networking device 206c may have a priority value of "1", and the priority condition may provide that the networking device with the highest priority will be elected the designated networking device. In this example, because the priorities of networking devices 206a and 206b both satisfy this priority condition, each of the networking devices 206a and 206b may determine that the priorities of networking devices that exchanged the PIM hello messages match. In some embodiments, the relative priorities of the networking devices may take precedence over the comparing of interface performance properties of the networking device 206a-206c when determining whether to forward data traffic by those networking device 206a-206c by electing a designated networking device, as discussed below.

Figure 5:
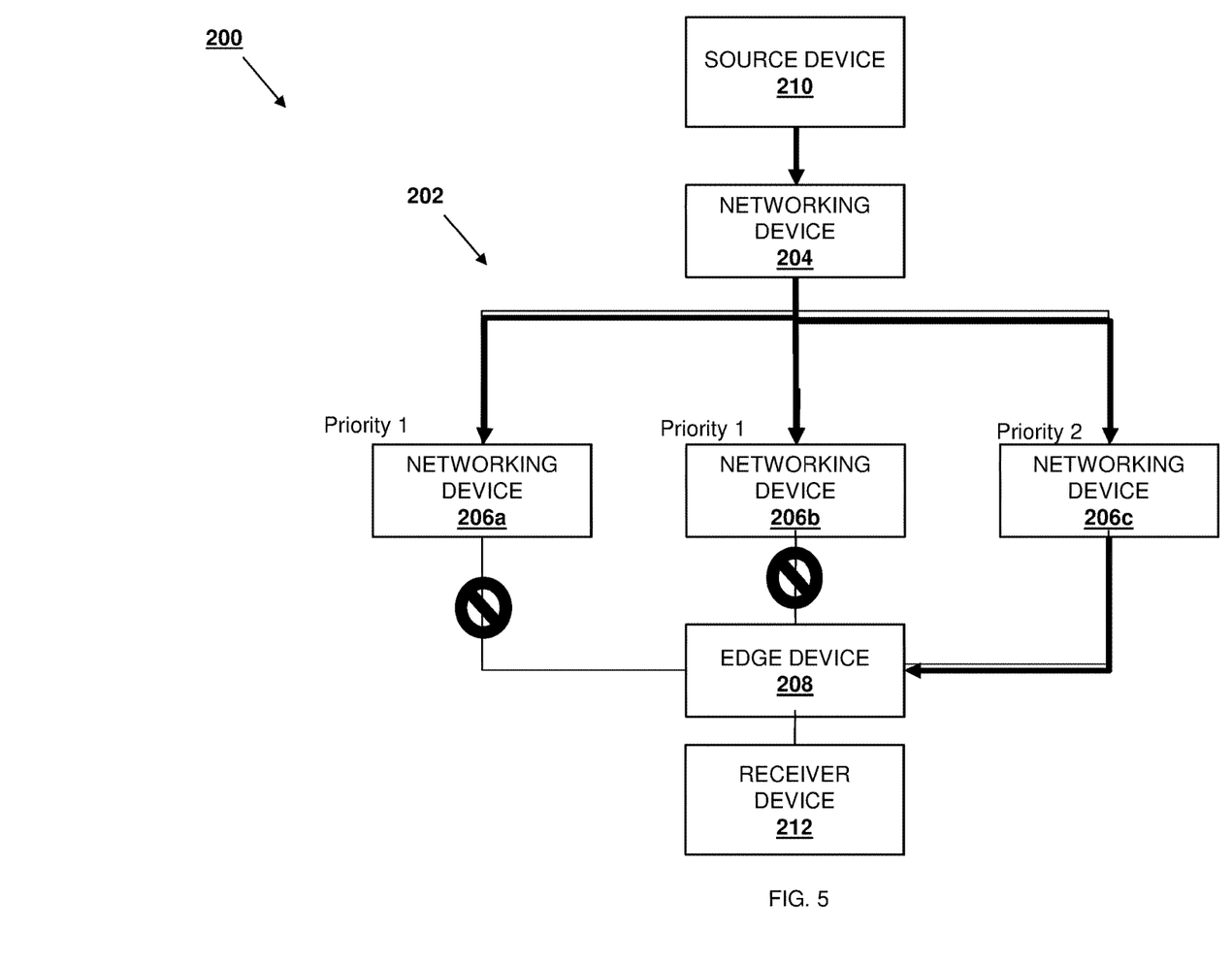
FIG. 5 is a schematic view illustrating an embodiment of the transmission of data traffic in the PIM designated networking device election system of FIG. 2 during the method of FIG. 4.

In an embodiment, if it is determined that the priorities of the networking devices do not match, then the method 400 may proceed to block 406 where the priorities are used to elect a designated networking device. As such, at block 406, the forwarding engines 304 of the networking devices 206a-206b may elect a designated networking device using the respective priorities of those networking devices 206a-206c. For example and referring to FIG. 5, the networking device 206a is illustrated with a priority value of "1", the networking device 206b is illustrated with a priority value of "1", and the networking device 206c is illustrated with a priority value of "2". Continuing with the example above in which the priority condition provides that the networking device with the highest priority will be elected designated networking device, the networking device 206c with the highest priority value of "2" is elected the designated networking device. For example, when the networking device 206c determines that it has the highest priority value of "2" relative to the other networking devices 206a and 206b that satisfies the priority condition, the networking device 206c may configure itself to operate as a designated networking device. Furthermore, the other networking devices 206a and 206b will remain as non-elected networking devices, as each of the networking devices 206a and 206b will determine that their priority values do not satisfy the priority condition when comparing those priority values to that of the networking device 206c.

The method 400 then proceeds to block 408 where data traffic is forwarded by the designated networking device. In an embodiment, at block 408, the forwarding engine 304 of the networking device that is elected as the designated networking device may forward data traffic to or from the edge device 208. For example, the designated networking device may forward PIM join data traffic received from to the networking device 204 from the receiver device 212. Furthermore, if it is located between the source device and the networking device 204, the designated networking device may forward PIM register data traffic to the networking device 204 from the source device 210. In some embodiments, the multicast group 202 may provide an underlay network for a virtual extensible Local Area Network (VxLAN) via network virtualization technology that utilizes a virtual LAN (VLAN)-like encapsulation technique to encapsulate Open Systems Interconnect (OSI) layer 2 Ethernet frames with layer 4 User Datagram Protocol (UDP)

datagrams, which can provide enhanced scalability for cloud computing environments, as well as other benefits known in the art.

For example, VxLAN endpoint devices included in a VxLAN are referred to as VxLAN Tunnel EndPoint (VTEP) devices that may be provided by physical or virtual switch devices, and operate to terminate VxLAN tunnels provided through the VxLAN, while edge devices such as Provider Edge (PE) devices and Customer Edge (CE) devices couple to the VxLAN and may transmit data traffic via the VTEP devices to each other. Furthermore, some CE devices may be provided in a multi-homing configuration (e.g., using Border Gateway Protocol (BGP) Ethernet Virtual Private Network (EVPN) multi-homing techniques) with multiple VTEP devices (e.g., the networking device 206a-206c) that are each connected that CE device (e.g., the edge device 208) and that operate together as a single logical device (e.g., a single logical switch device) in order to provide redundancy and/or other benefits known in the art. In such multi-homing configurations, data traffic such as Broadcast, Unknown Unicast, and Multicast (BUM) data traffic received by the VTEP devices may be forwarded to the CE device, and that BUM data traffic may require a multicast protocol. As such, when the VTEP devices are in a multi-homing configuration, the VTEP devices may require one of the VTEP devices to be designated for forwarding BUM data traffic as, otherwise, the VTEP devices will operate to provide duplicate traffic to the CE device. However, while specific examples of data traffic being forwarded by a designated networking device is described, one of skill in the art in possession of the present disclosure will recognize that other types of data traffic in the PIM designated networking device election system 200 will fall within the scope of the present disclosure.

The method 400 then proceeds to block 410 where non-designated networking device(s) prevent forwarding of a copy of the data traffic forwarded by the designated networking device. In an embodiment, at block 410, the forwarding engine 304 of the non-designated networking device(s) may prevent or block data traffic that is a copy of the data traffic forwarded by the designated networking device. For example and referring to FIG. 5, the source device 210 may send data traffic to the networking device 204, which may multicast the data traffic (e.g., according to the PIM protocol) to the networking device 206a, the networking device 206b, and the networking device 206c. As discussed in the example provided above, the networking device 206c has been designated as the designated networking device such that its forwarding engine 304 forwards the data traffic to the edge device 208, while the networking device 206a has been designated as a non-designated networking device such that its forwarding engine 304 prevents forwarding of the data traffic (which is a copy of the data traffic forwarded by the networking device 206c), and the networking device 206b has also been designated as a non-designated networking device such that its forwarding engine 304 prevents forwarding of the data traffic.

Referring back to decision block 404, if it is determined that the priorities of the networking devices that exchanged the discovery message match, then the method 400 proceeds to decision block 412 where it is determined whether the networking devices support designated networking device election based on an interface performance property. In an embodiment, at decision block 412, the forwarding engine 304 of each of the networking devices 206a-206c may determine whether the networking devices 206a-206c coupled to the edge device 208 support networking device designation based on an interface performance property. For example, each of the networking devices 206a-206c may refer to the election table 306a to determine whether the discovery messages (e.g., PIM hello messages) received by each of the other networking devices indicated that those other networking devices are configured to elect a designated networking device based on an interface performance property. In some embodiments, in the event one of the networking devices 206a-206c does not support designated networking device election based on an interface performance property, then electing a designated networking device may be determined using conventional techniques.

However, if at decision block 412 it is determined that the networking devices support designated networking device election based on an interface performance property, then the method 400 proceeds to decision block 414 where it is determined whether interface performance properties match. In an embodiment, at decision block 414, the forwarding engine 304 of each of the networking devices 206a-206c may determine whether the interface performance properties of the other networking devices coupled to the edge device 208 match with its own interface performance properties. For example, the networking device 206a may determine whether the interface performance property of the networking device 206a and the interface performance properties in the election table 306a for the other networking devices 206b and 206c match, or are substantially equivalent to each other. As would be appreciated by one of skill in the art in possession of the present disclosure, interface performance properties may match when there are at least two networking devices that have the same interface performance properties that satisfy a interface performance property condition (e.g., a predefined interface performance property condition). For example, each of the networking device 206a and the networking device 206b may have a bandwidth of "40 Gbps" on its respective interface to the edge device 208, while the networking device 206c may have a bandwidth of "10 Gbps" on its interface to the edge device 208, and the interface performance property condition may provide that the networking device providing the highest bandwidth interface will be elected as the designated networking device. Because the bandwidths of the networking devices 206a and 206b both satisfy this interface performance condition, it may be determined that bandwidths of the networking devices that exchanged the PIM hello messages match.

Figure 6:
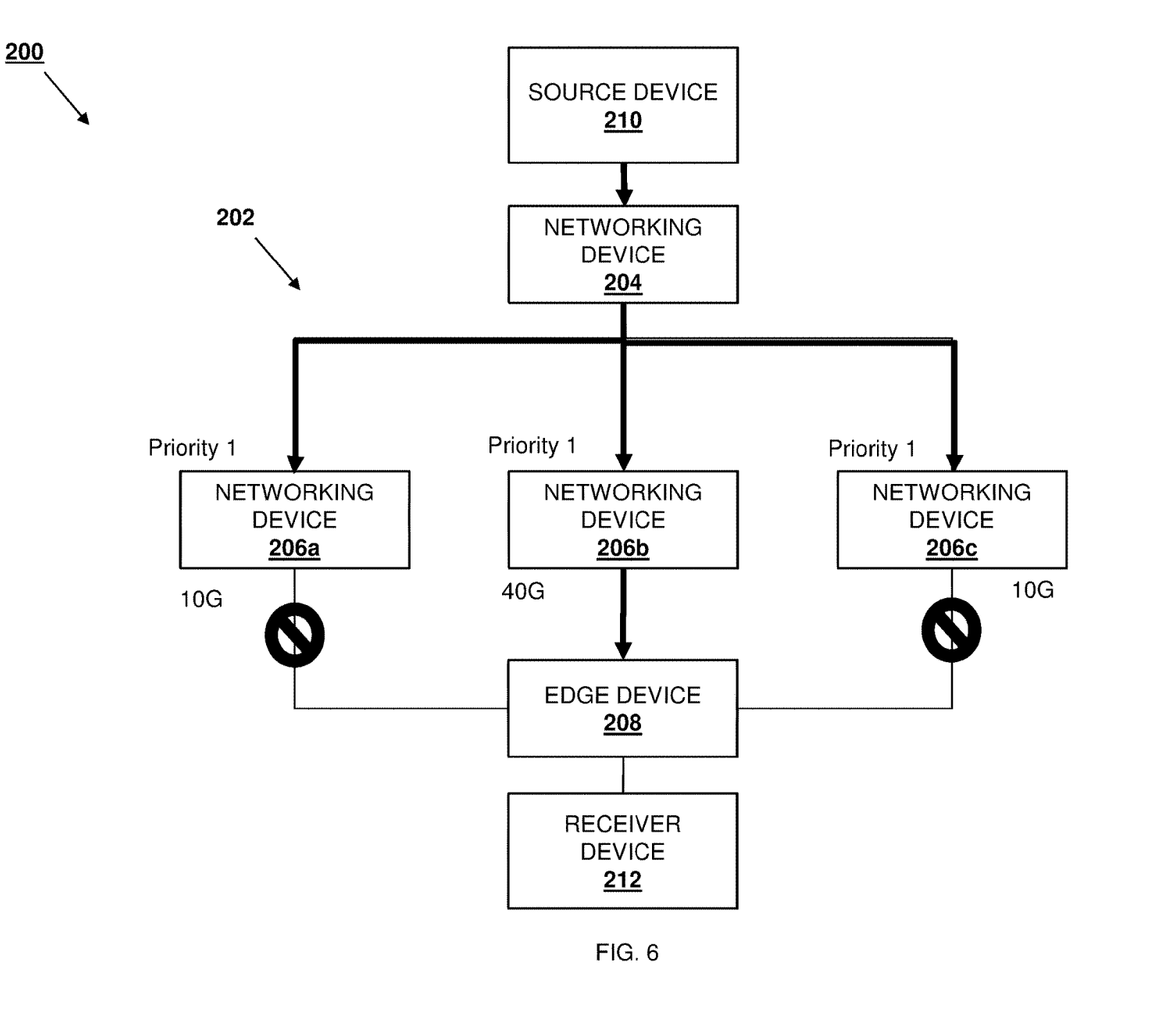
FIG. 6 is a schematic view illustrating an embodiment of the transmission of data traffic in the PIM designated networking device election system of FIG. 2 during the method of FIG. 4.

If, at decision block 414, it is determined that the interface performance properties of the networking devices do not match, then the method 400 may proceed to block 416 where the interface performance properties are used to elect a designated networking device. In an embodiment, at block 416, the forwarding engines 304 of the networking devices 206a-206b may elect a designated networking device using their respective interface performance properties. For example and referring to FIG. 6, the networking device 206a is illustrated with a bandwidth of "10 Gbps" on its interface to the edge device 208, the networking device 206b is illustrated with a bandwidth of "40 Gbps" on its interface to the edge device 208, and the networking device is illustrated with a bandwidth of "10 Gbps" on its interface to the edge device 208. As discussed above, the interface performance property condition may provide that the networking device with the highest bandwidth will be elected the designated networking device, and because the networking device 206b has the highest bandwidth of 40 Gbps, the networking device 206b is elected the designated networking device. For example, when the networking device 206b determines that it has the highest bandwidth of the networking devices 206*a*-206*c*, the networking device 206*b* may configure itself to operate as a designated networking device, while the other networking devices 206*a* and 206*c* may remain as non-elected networking devices (as each of the networking devices 206*a* and 206*b* may compare their respective bandwidths to the bandwidth in their election tables 306*a* for the networking device 206*c*, and determine that their bandwidths do not satisfy the interface performance property condition.

The method 400 then proceeds to block 408 where data traffic is forwarded by the designated networking device. In an embodiment, at block 408, the forwarding engine 304 of the networking device that is elected as the designated networking device may forward data traffic to or from the edge device 208. For example, the designated networking device may forward PIM join data traffic to the networking device 204 from the receiver device 212, and if located between the source device 210 and the networking device 204, the designated networking device may forward PIM register data traffic to the networking device 204 from the source device 210. As discussed above, the multicast group 202 may provide an underlay network for a VxLAN, and the designated networking device may forward Ethernet data traffic such as BUM data traffic in a similar manner. However, while specific examples of data traffic being forwarded by a designated networking device are described, one of skill in the art in possession of the present disclosure will recognize that the forwarding of other types of data traffic in the PIM designated networking device election system 200 will fall within the scope of the present disclosure.

The method 400 then proceeds to block 410 where non-designated networking device(s) prevent forwarding of a copy of the data traffic forwarded by the designated networking device. In an embodiment, at block 410, the forwarding engine 304 of the non-designated networking device(s) may prevent or block data traffic that is a copy of the data traffic forwarded by the designated networking device. For example and referring to FIG. 6, the source device 210 may send data traffic to the networking device 204, which may multicast the data traffic (e.g., according to the PIM protocol) to the networking device 206*a*, the networking device 206*b*, and the networking device 206*c*. As discussed above, the networking device 206*b* has been designated as the designated networking device in this example such that the forwarding engine 304 in the networking device 206*b* forwards the data traffic to the edge device 208, while the networking device 206*a* has been designated a non-designated networking device such that the forwarding engine 304 of the networking device 206*a* prevents forwarding of the data traffic, and the networking device 206*c* has also been a non-designated networking device such that the forwarding engine 304 of the networking device 206*c* prevents forwarding of the data traffic as well.

Referring back to decision block 412 and decision block 414, if at decision block 412 it is determined that at least one of the networking devices do not support designated networking device election based on an interface performance property, or if at decision block 414 it is determined that the interface performance properties of the networking devices match, then the method 400 proceeds to block 418 where interface identifiers of the networking devices are used to elect the designated networking device. In an embodiment, at block 418, the forwarding engines 304 of the networking devices 206*a*-206*c* may elect a designated networking device using respective interface identifiers. As will be appreciated by one of skill in the art in possession of the present disclosure, the interface identifier may be an IP address, a MAC address, and/or any other network interface identifier or networking device identifier known in the art and, at block 418 the forwarding engine 304 of each networking device 206*a*-206*c* may determine whether the interface identifiers in the election table 306*a* satisfy an interface identifier condition. In a specific example, interface identifier conditions may provide that the networking device with the highest valued interface identifier will be the designated networking device.

Figure 7:
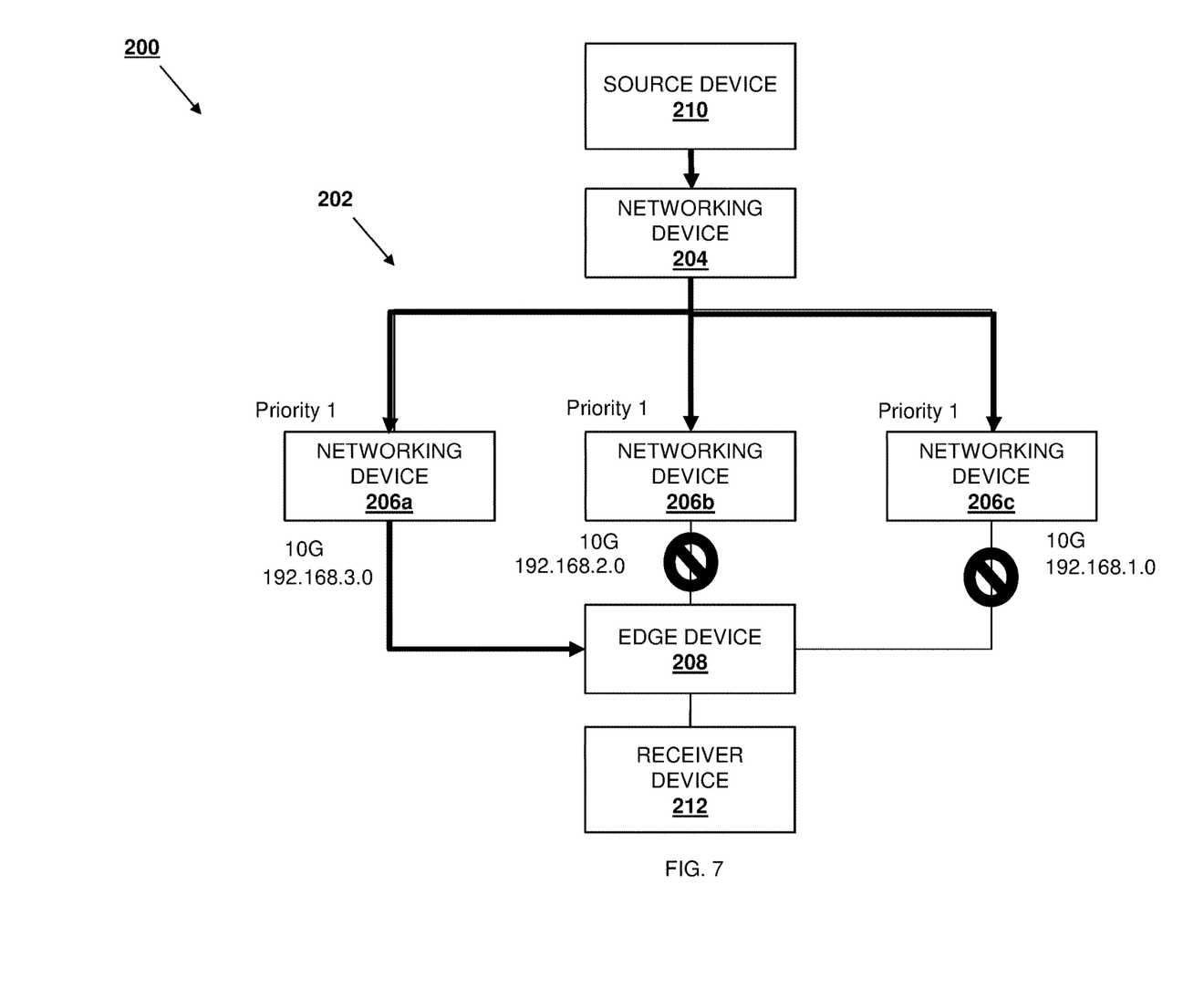
FIG. 7 is a schematic view illustrating an embodiment of the transmission of data traffic in the PIM designated networking device election system of FIG. 2 during the method of FIG. 4.

For example and referring to FIG. 7, the networking device 206*a* is illustrated with a bandwidth of "10 Gbps" for its interface with the edge device 208 and a priority of "1", the networking device 206*b* is illustrated with a bandwidth of "10 Gbps" for its interface with the edge device 208 and a priority of "1", and the networking device 206*c* is illustrated with a bandwidth of "10 Gbps" for its interface with the edge device 208 and a priority of "1". Thus, because the priorities and the interface performance parameters match for each networking device 206*a*-206*c*, the networking devices 206*a*-206*c* will operate to determine whether any of the networking device 206*a*-206*c* satisfy an interface identifier condition. As discussed above, the interface identifier condition may provide that the networking device with the highest interface identifier will be elected the designated networking device, and in the illustrated example, the networking device 206*a* is illustrated with an IP address of "192.168.3.0", the networking device 206*b* is illustrated with an IP address of "192.168.2.0", and the networking device 206*c* is illustrated with an IP address of "192.168.1.0." As such, because the networking device 206*a* has the highest interface identifier value (i.e., the 192.168.3.0 IP address), the networking device 206*a* is elected the designated networking device. Thus, the networking device 206*a* may determine that it has the highest interface identifier, and configure itself as a designated networking device, while the other networking devices 206*b* and 206*c* will remain as non-elected networking devices (as each of the networking devices 206*b* and 206*b* may compare its respective interface identifier in its election tables 306*a* with the interface identifier for the networking device 206*a*, and determine that their interface identifiers do not satisfy the interface identifier condition.)

The method 400 then proceeds to block 408 where data traffic is forwarded by the designated networking device. In an embodiment, at block 408, the forwarding engine 304 of the networking device that is elected as the designated networking device may forward data traffic to and from the edge device 208. For example, the designated networking device may forward PIM join data traffic to the networking device 204 from the receiver device 212, and if located between the source device and the networking device 204, the designated networking device may forward PIM register data traffic to the networking device 204 from the source device 210. As discussed above, the multicast group 202 may provide an underlay network for a VxLAN, and the designated networking device may forward Ethernet data traffic such as BUM data traffic.

The method 400 then proceeds to block 410 where non-designated networking device(s) prevent forwarding of a copy of the data traffic forwarded by the designated networking device. In an embodiment, at block 410, the forwarding engine 304 of the non-designated networking device(s) may prevent or block data traffic that is a copy of the data traffic forwarded by the designated networking device. For example and referring to FIG. 7, the source device 210 may send data traffic to the networking device 204, which may multicast the data traffic (according to the PIM protocol) to the networking device 206a, the networking device 206b, and the networking device 206c. As discussed above, the networking device 206a has been designated as the designated networking device such that its forwarding engine 304 forwards the data traffic to the edge device 208, while the networking device 206b has been designated as a non-designated networking device such that its forwarding engine 304 prevents forwarding of the data traffic, and the networking device 206c has also been designated as a non-designated networking device such that its forwarding engine 304 prevents forwarding of the data traffic as well.

Thus, systems and methods have been described that provide for designated networking device election and data traffic forwarding on that designated networking device. A plurality of networking devices that are each coupled to an edge device elect a designated networking device from the plurality of networking devices by providing, in discovery messages exchanged between the networking devices and provided by the PIM protocol, an indication as to whether each networking device is enabled to elect a designated networking device based on an interface performance property. If all of the networking devices are enabled to elect a designated networking device based on an interface performance property, then the networking device that determines that it alone satisfies an interface performance property condition based on interface performance properties of each networking device that exchanged the discovery messages designates itself as the designated networking device and forwards data traffic to the edge device or from the edge device, while the other networking devices remain as non-designated networking devices and prevent traffic from being forwarded. As such, bandwidth on links between the networking devices and the edge device is utilized more evenly than in conventional systems that elect a designated networking device based simply on an interface identifier or via the manual adjustment of priorities of the networking devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Protocol Independent Multicast (PIM) designated networking device election system, comprising:
an edge device;
a multicast group that includes at least one rendezvous networking device,
wherein a source device provides messages to the at least one rendezvous networking device to join the multicast group and generates and directs multicast data traffic to the at least one rendezvous networking device, and
wherein receiver networking devices provide messages to the at least one rendezvous networking device to join the multicast group and pull multicast data traffic received by the at least one rendezvous networking device from the source device;
a first receiver networking device that is included in the multicast group, that is coupled to the edge device via a first respective link, and that receives the multicast data traffic generated by the source device via the at least one rendezvous networking device; and
a second receiver networking device that is included in the multicast group, that is coupled to the edge device via a second respective link, and that receives the multicast data traffic generated by the source device via the at least one rendezvous networking device, wherein the second receiver networking device is configured to:
receive a first Protocol Independent Multicast (PIM) message from the first receiver networking device;
determine that the first PIM message indicates that the first receiver networking device supports designated networking device election based on an interface performance property, and identifies a first interface performance property of the first receiver networking device;
determine whether the first interface performance property of the first receiver networking device that is identified in the first PIM message, or a second interface performance property of the second receiver networking device, satisfy an interface performance property condition; and
forward, in response to determining that the second interface performance property of the second receiver networking device satisfies the interface performance property condition and the first interface performance property of the first receiver networking device does not satisfy the interface performance property condition, the multicast data traffic, which was generated by the source device and identical copies of which are received at both the first receiver networking device and the second receiver networking device, from the second receiver networking device via the second respective link and toward the edge device while the first receiver networking device prevents the forwarding of the multicast data traffic via the first respective link.

2. The system of claim 1, wherein the first receiver networking device is configured to:
receive a second PIM message from the second receiver networking device; determine that the second PIM message indicates that the second receiver networking device supports designated networking device election based on the interface performance property, and identifies the second interface performance property of the first receiver networking device; and
prevent, in response to determining that the second interface performance property of the second receiver networking device identified in the second PIM message satisfies the interface performance property condition and that the first interface performance property of the first receiver networking device does not satisfy the interface performance property condition, the multicast data traffic, which was generated by the source device and identical copies of which are received at both the first receiver networking device and the second receiver networking device, from being forwarded from the first receiver networking device via the first respective link toward the edge device.

3. The system of claim 1, wherein each of the first interface performance property and the second interface performance property are an interface speed property.

4. The system of claim 1, wherein each of the first interface performance property and the second interface performance property are an interface bandwidth property.

5. The system of claim 4, wherein each of the first interface performance property and the second interface performance property are an interface latency property.

6. The system of claim 1, wherein the second receiver networking device is configured to:
transition to operating as a designated networking device in order to forward the multicast data traffic from the second receiver networking device via the second respective link and toward the edge device.

7. The system of claim 1, wherein the first receiver networking device is configured to:
transition to operating as a non-designated networking device in order to prevent forwarding of the multicast data traffic from the first receiver networking device via the first respective link and toward the edge device.

8. The system of claim 1, wherein the second receiver networking device is configured to receive the multicast data traffic from the source device independent of the first receiver networking device.

9. An Information Handling System (IHS), comprising:
a processing system that is configured as part of a multicast group that includes at least one rendezvous networking device, wherein a source device provides messages to the at least one rendezvous networking device to join the multicast group and generates and directs multicast data traffic to the at least one rendezvous networking device, and wherein receiver networking devices provide messages to the at least one rendezvous networking device to join the multicast group and pull multicast data traffic received by the at least one rendezvous networking device from the source device;
a communication subsystem that is coupled to the processing system, that is coupled to the edge device via a second respective link, and that is configured to receive the multicast data traffic generated by the source device via the at least one rendezvous networking device; and
a memory system that is coupled to the processing system and that includes instructions that, when executed by the processing system, cause the processing system to provide a forwarding engine that is configured to:
receive, via the communication subsystem from a first receiver networking device that is included in the multicast group, that is coupled to the edge device via a first respective link, and that is configured to receive the multicast data traffic generated by the source device via the at least one rendezvous networking device, a first Protocol Independent Multicast (PIM) message;
determine that the first PIM message indicates that the first receiver networking device supports designated networking device election based on an interface performance property, and identifies a first interface performance property of the first receiver networking device;
determine whether the first interface performance property of the first receiver networking device that is identified in the first PIM message, or a second interface performance property of the communication subsystem, satisfy an interface performance property condition; and
forward, in response to determining that the second interface performance property of the communication subsystem satisfies the interface performance property condition and the first interface performance property of the first receiver networking device does not satisfy the interface performance property condition, the multicast data traffic, which was generated by the source device and identical copies of which are received at both the first receiver networking device and the communication subsystem, from the communication subsystem via the second respective link and toward the edge device, wherein the second interface performance property satisfying the interface performance property condition and the first interface performance property not satisfying the interface performance property condition causes the first receiver networking device to prevent the forwarding of the multicast data traffic via the first respective link.

10. The IHS of claim 9, wherein each of the first interface performance property and the second interface performance property are an interface speed property.

11. The IHS of claim 9, wherein each of the first interface performance property and the second interface performance property are an interface bandwidth property.

12. The IHS of claim 9, wherein each of the first interface performance property and the second interface performance property are an interface latency property.

13. The IHS of claim 9, wherein the forwarding engine is configured to receive the multicast data traffic from the source device independent of the first receiver networking device.

14. The IHS of claim 9, wherein the forwarding engine is configured to:
transition to operating as a designated networking device in order to forward the multicast data traffic from the communication system via the second respective link and toward the edge device.

15. A method for electing a designated networking device, comprising:
operating, by a second receiver networking device that is coupled to an edge device by a second respective link, as part of a multicast group that includes at least one rendezvous networking device that is coupled to the second receiver networking device, wherein a source device provides messages to the at least one rendezvous networking device to join the multicast group and generates and directs multicast data traffic to the at least one rendezvous networking device, and wherein a first receiver networking device and the second receiver networking device provided messages to the at least one rendezvous networking device to join the multicast group and pull multicast data traffic received by the at least one rendezvous networking device from the source device;
receiving, by the second receiver networking device via the at least one rendezvous networking device, the multicast data traffic generated by the source device;
receiving, by the second receiver networking device from the first receiver networking device that is coupled to the edge device by a first respective link and that receives the multicast data traffic generated by the source device via the at least one rendezvous networking device, a first Protocol Independent Multicast (PIM) message;
determining, by the second receiver networking device, that the first PIM message indicates that the first receiver networking device supports designated networking device election based on an interface performance property, and identifies a first interface performance property of the first receiver networking device;
determining, by the second receiver networking device, whether the first interface performance property of the first receiver networking device that is identified in the first PIM message, or a second interface performance property of the second receiver networking device, satisfy an interface performance property condition; and forwarding, by the second receiver networking device and in response to determining that the second interface performance property of the second receiver networking device satisfies the interface performance property condition and the first interface performance property of the first receiver networking device does not satisfy the interface performance property condition, the multicast data traffic, which was generated by the source device and identical copies of which are received at both the first receiver networking device and the second receiver networking device, from the second receiver networking device via the second respective link toward the edge device, wherein the second interface performance property satisfying the interface performance property condition and the first interface performance property not satisfying the interface performance property condition causes the first receiver networking device to prevent the forwarding of the multicast data traffic via the first respective link.

16. The method of claim 15, further comprising:
receiving, by the first receiver networking device from the second receiver networking device, a second PIM message;
determining, by the first receiver networking device, that the second PIM message indicates that the second receiver networking device supports designated networking device election based on the interface performance property, and identifies the second interface performance property of the first receiver networking device; and
preventing, by the first receiver networking device and in response to determining that the second interface performance property of the second receiver networking device identified in the second PIM message satisfies the interface performance property condition and that the first interface performance property of the first receiver networking device does not satisfy the interface performance property condition, the multicast data traffic, which was generated by the source device and identical copies of which are received at both the first receiver networking device and the second receiver networking device, from being forwarded from the first receiver networking device via the first respective link toward the edge device.

17. The method of claim 15, wherein each of the first interface performance property and the second interface performance property are an interface speed property.

18. The method of claim 15, wherein each of the first interface performance property and the second interface performance property are an interface bandwidth property.

19. The method of claim 15, wherein each of the first interface performance property and the second interface performance property are an interface latency property.

20. The method of claim 15, further comprising:
transitioning, by the second receiver networking device, to operating as a designated networking device in order to forward the multicast data traffic from the second receiver networking device via the second respective link and toward the edge device; and
transitioning, by the first receiver networking device, to operating as a non-designated networking device in order to prevent forwarding of the multicast data traffic from the first receiver networking device via the first respective link and toward the edge device.

* * * * *